March 7, 1967

P. RASIMENOKS ET AL 3,307,763

THERMOCOMPRESSION WIRE BONDING APPARATUS
WITH SCISSORS CUT-OFF

Filed June 28, 1963

INVENTORS
PAVELS RASIMENOKS
THOMAS L. ANGELUCCI
BY FREDERICK W. KULICKE, JR.

Bilber & Moyerman
ATTORNEYS.

INVENTORS
PAVELS RASIMENOKS
THOMAS L. ANGELUCCI
BY FREDERICK W. KULICKE, JR.

ATTORNEYS.

March 7, 1967 P. RASIMENOKS ET AL 3,307,763
THERMOCOMPRESSION WIRE BONDING APPARATUS
WITH SCISSORS CUT-OFF
Filed June 28, 1963 6 Sheets-Sheet 6
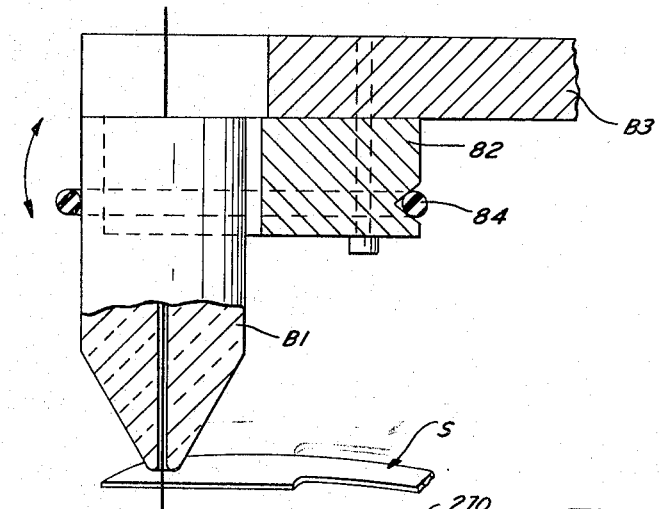
FIG. 10
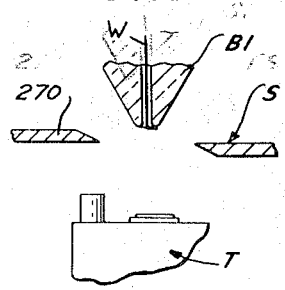
FIG. 11
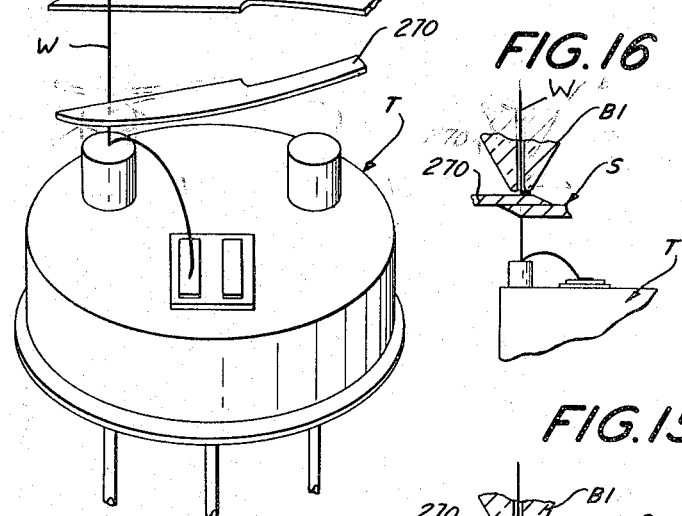
FIG. 16
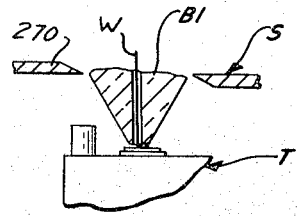
FIG. 12
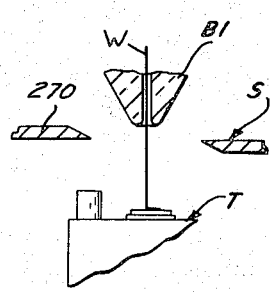
FIG. 13
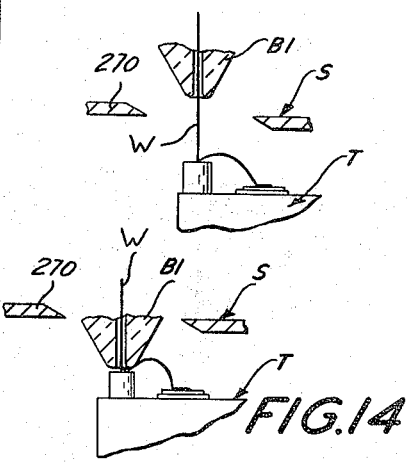
FIG. 15
FIG. 14
INVENTORS
PAVELS RASIMENOKS
THOMAS L. ANGELUCCI
BY FREDERICK W. KULICKE, JR.
ATTORNEYS.

United States Patent Office 3,307,763
Patented Mar. 7, 1967

3,307,763
THERMOCOMPRESSION WIRE BONDING APPARATUS WITH SCISSORS CUT-OFF
Pavels Rasimenoks, Thomas L. Angelucci, and Frederick W. Kulicke, Jr., Philadelphia, Pa., assignors to Kulicke and Soffa Manufacturing Company, Fort Washington, Pa., a corporation of Pennsylvania
Filed June 28, 1963, Ser. No. 291,457
9 Claims. (Cl. 228—3)

This invention relates to a bonding apparatus for thermocompressively securing fine leads to semiconductor devices, and more particularly relates to a wire severing system for an instrument in which the bonding is performed by a vertically-reciprocably capillary tool having a continuous wire filament dispensed thereto from a spool.

In the manufacture of transistors and other solid state micro-circuit devices, fine wire leads are connected from minute metallized electrodes on semiconductor wafers to their corresponding terminal posts on a header. These tiny electrodes are incorporated on the semiconductor surface in a variety of patterns and have many defined geometric shapes depending upon the desired characteristics of the completed solid state device. The total area of an individual electrode sometimes does not exceed more than one square mil, and the distance which adjacent electrodes are spaced apart frequently is as little as one mil (.001 inch). It has been found that thermocompression bonding is an effective means for securing the extremely fine gauge lead wire whose diameter may range from a few mils to a few tenths of a mil.

During the early stages of development of thermocompression bonding, a wedge bonding technique was employed. This involved the use of a stylus tool which was pressed into contact with a wire end positioned so as to overlie the heated bonding area on the semiconductor. Both the wire and the tool itself had to be individually manipulated to the precise location of the electrode. The pressure or force applied by the tool during contact was sufficient to cause the wire to flow and bond to the semiconductor electrode. Cut-off of the wire was performed only at the terminal post because of the additional loading pressure necessary to sever the wire. Since there was no way to retain the wire in controlled contact with the end of the stylus after cut-off, or even after stitching, each bonding sequence required that both the tool and the wire be separately manipulated with each bond. This necessarily resulted in a time consuming and fatiguing operation.

In "nail head" bonding, the lead wire is dispensed from a rotatably supported spool through a vertically reciprocable tool, called a capillary. The passing of a hot flame across the wire depending from the capillary tip creates the formation of an enlarged ball at the severed end of the lead. The capillary with its depending ball is then depressed into contact with the heated semiconductor surface so as to smash the ball into the characteristic nail-head shape. Since the wire is always carried within the capillary which also acts as the bonding tool, only a single element need be manipulated with consequent speed-up in bonding operations. However, considerable time is still consumed in severing the wire after each bonding sequence since the flame must be passed across the wire with great precision and at an exacting rate in order to form the required critical ball size. Another limitation of nail head bonding is the circular cross section of the bond which precludes use where the spacing of adjacent electrodes is such as to cause a likelihood of shorting the electrodes during thermocompressive deformation of the ball.

The instant invention is also directed to the use of a vertically-reciprocable capillary bonding tool to which wire is continuously dispensed from a spool. However, instead of severing the lead by passing a flame across the downwardly depending wire, cut-off is performed instantly by a scissors which is oriented perpendicular to the wire axis immediately below the capillary tip. When the lead is snipped, the upper blade of the scissors carries along a small length of the downwardly depending wire and bends it in the form of an L-shaped hook under the capillary tip. In making the first bond of a lead securing sequence, the capillary acts against the hook when the tool is depressed into engagement with the semiconductor rather than against a ball. Hence, the periphery of the capillary tip is urged transversely against a hook having the same diameter as the wire itself. Accordingly, the bond which is made by the hereindescribed scissors cut-off instrument is a "wedge bond."

It is an object of this invention to provide a thermocompression wire bonding apparatus with scissors cut-off wherein both the wire and the bonding tool can be positioned simultaneously by a single manipulation.

Another object of this invention is to provide a scissors cut-off wire bonding instrument in which the wire is severed and formed as a hook below the capillary after each bonding sequence in full preparation for the next bonding operation.

Another object of this invention is to provide a thermocompression wire bonding instrument which will permit the securing of leads to semiconductor devices with great speed hitherto unobtainable.

Another object of this invention is to provide a thermocompression bonding instrument which will perform wafer-to-post bonds, post-to-wafer bonds, or a series of stitch bonds in any desired order or sequence.

Still another object of this invention is to provided a thermocompression bonding instrument which will secure leads to semiconductor geometry of any shape or configuration whatsoever without requiring rotation or repositioning of the semiconductor.

Yet another object of this invention is to provide a thermocompression bonding instrument in which successive wire bonds can be incorporated in any direction or sequence upon the semiconductor without limitation.

A further object of this invention is to provide a thermocompression lead bonding instrument which will accommodate annealed or unannealed wire of diameters ranging from 0.4 mil to 3 mils with equal facility.

A still further object of this invention is to provide a scissors cut-off wire bonding instrument which requires a minimum of adjustment and set-up time.

Yet a further object of this invention is to provide a scissors cut-off wire bonding instrument in which successive bonds can be made rapidly, uniformly and without scrubbing.

Another object of this invention is to provide a thermocompression bonding instrument which requires a minimum of operator discretion.

Another object of this invention is to provide a scissors cut-off bonding instrument which permits rapid interchange of capillaries having either a full 360° tip or a relieved, horseshoe-segment tip.

Other objects of this invention are to provide an improved device of the character described which is easily and economically produced, that is study in construction, and highly efficient and effective in operation.

With the above and related objects in view, this invention consists of the details of construction and combination of parts as will be more fully understood from the following detailed description when read in conjunction with the following drawings, in which:

FIGURE 4 is a sectional view taken along lines 4—4 of FIGURE 2.

FIGURE 5 is an exploded perspective view of the scissors cut-off assembly.

FIGURE 10 is an enlarged fragmentary perspective view showing the manner in which leads are secured by the bonding capillary to the semiconductor device and the relationship of the scissors cut-off element to said capillary.

Figure 1:
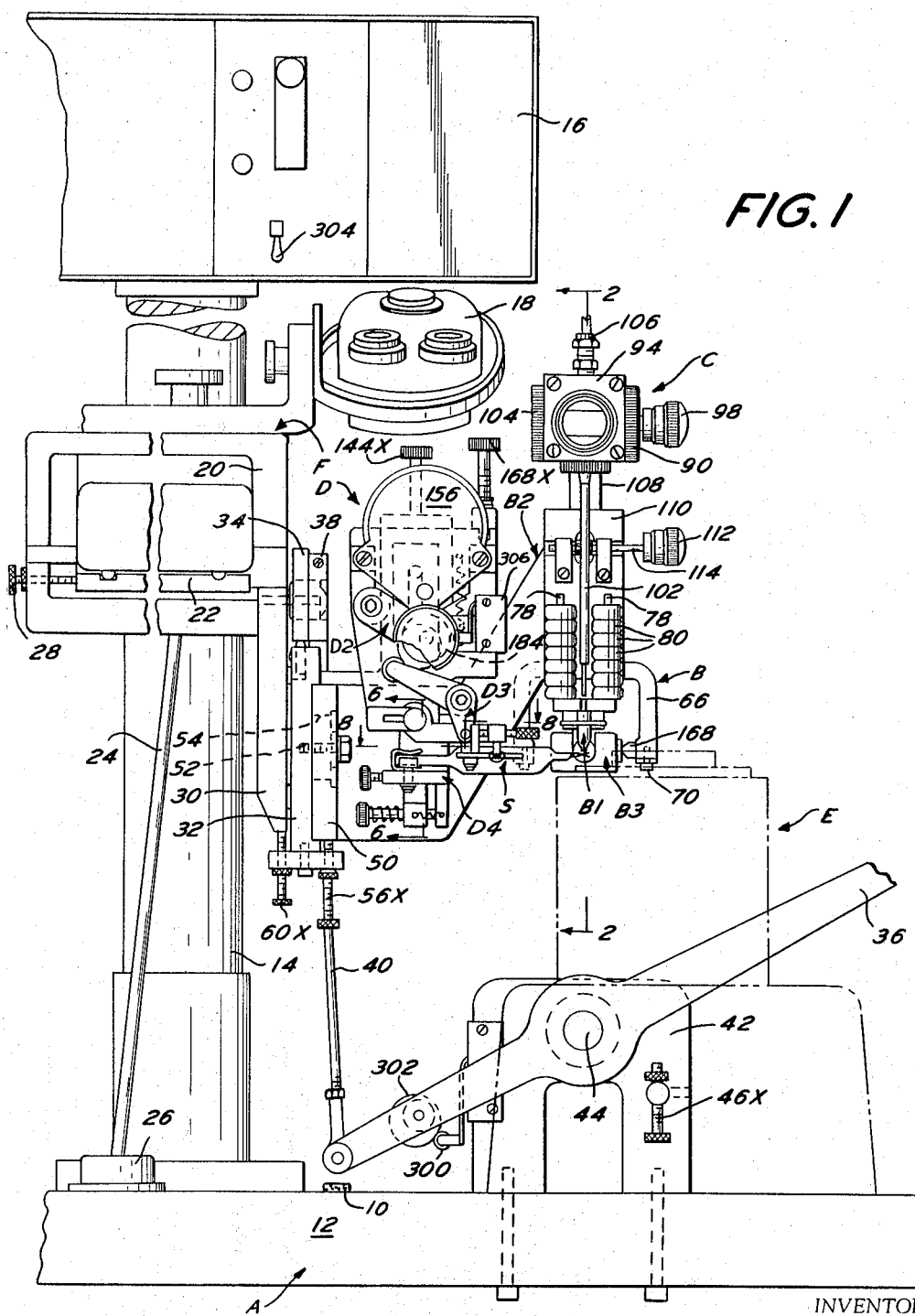
FIGURE 1 is a front elevational view of a thermocompression wire bonding apparatus with a scissors cut-off assembly embodying this invention.

FIGURES 11, 12, 13, 14, 15 and 16 disclose the various steps of the bonding and cut-off sequences.

Referring now in greater detail to the drawings in which similar reference characters refer to similar parts, the thermocompression lead bonding apparatus of the instant invention comprises a frame, generally designated as A, a vertically-reciprocable bonding head B, a wire feeding assembly C for continuously dispensing wire from a spool to the head, a wire cut-off assembly D, a heating column or stage E for supporting semiconductor devices T in position for lead bonding, and a manipulator F for horizontally orienting and then depressing the bonding head into engagement with the appropriate area of the semiconductor to which the lead is to be secured.

The bonding head B includes a capillary B1 which is mounted with a lever arm B3 pivotally supported about a horizontal axis in a bracket B2 on the manipulator F. Wire W is fed through the capillary B1 from the dispenser C and is engaged by the lower periphery of the capillary tip during the bonding operation. The bracket B2 is adapted to be horizontally positioned by the manipulator F so that the bonding tool B1 is oriented directly over the point on the semiconductor at which the lead is to be secured. Depression of a vertically slidable plate in the manipulator F causes the capillary tool B1 with the wire W hooked thereunder to be downwardly urged against the heated semiconductor T held in the stage E. When the tool B1 engages the semiconductor, the lever arm B3 is slightly rotated on its pivot from a rest position thereby enabling the capillary to apply a predetermined, dead-weight bonding load. Elevating the vertically-reciprocable plate of the manipulator F raises the capillary tip B1 from a position between a vertically fixed scissors S to a height immediately above the open blades thereof in readiness for performing the next bond. When a bonding sequence has been completed, for example, an electrode coupled to a post, the scissors blades are actuated by a switch into a closed position. The scissors element S snips the wire W immediately below the bonding tool, and the upper blade of the scissors tucks the severed depending end of the wire in the form of an L-shaped hook under the capillary tip. The instrument is now prepared for the next sequence of lead bonding operations.

The frame A includes a base or table top 12 having a column 14 upwardly extending therefrom and supporting a console module 16 which contains various electrical and gas control components. The manipulator F upon which the bonding head B and the cut-off assembly D is secured is adjustably affixed to the column 14 by suitable brackets (not shown). A stereo miscroscope 18 is mounted upon the manipulator F and is movable therewith so that the operator may constantly observe under three-dimensional magnification the position of the bonding capillary B1 with respect to the exact location on the semiconductor T to which the lead wire is to be bonded.

The manipulator F comprises a micropositioning assembly substantially the same as that fully shown and described in U.S. Patent No. 3,149,510, for an invention by Frederick W. Kulicke, Jr., in "Fine Wire Manipulator and Bonding Instrument for Transistors." Briefly, and as generally illustrated in FIGURE 1, the manipulator F includes an outer shell member 20 which is horizontally slidable with respect to a fixed base stage 22. A downwardly depending rod 24 is universally coupled to the base stage 22 and the outer shell member 20, the lower end of the rod being received within a universal joint in a fingerpiece 26 which is slidable on the table top 12. Horizontal movement of the "chessman" fingerpiece 26 on the table surface 12 transmits a proportionately reduced inverse movement along X- and Y-axes to the outer shell 20. That is, movement of the fingerpiece 26 in one direction causes the shell 20 to move in the opposite direction in order to compensate for the microscope inversion effect. A positioning limit stop 28 is incorporated on the manipulator F to restrict movement of the shell 20 in the right hand direction, as shown in FIGURE 1, so as to prevent accidental collision of the delicate scissors S or capillary B1 with the heating stage E.

Affixed to the shell member 20 and downwardly depending therefrom is a vertical guideway 30 which resiliently supports a vertically slidable plate 32 on the face thereof. Springs (not shown) urge the slider plate 32 upwardly against a cam 34 rotatably supported in the manipulator base stage 22. The cam 34 is coupled to an actuating lever 36 through crank 38 and connecting rod 40. The Z-axis lever 36 is pivotally supported in frame pedestal 42 by shaft 44. Depressing the right hand portion of the lever 36 manually causes the Z-axis slider plate 32 to be urged downwardly as a result of rotation of cam 34. Adjustable stop screw 46X acts as a bottoming post for clockwise rotation of the Z-actuating lever 36 and so defines a lower limit for the position of the Z-slider plate 32.

The bonding head B comprises a main support casting B2 and a bonding arm B3 pivotally supported therein about a horizontal axis. The capillary or bonding tool B1 is retained in the forward end of the bonding arm B3. The casting B2 has an integrally formed saddle 50 which is slidably received by the slider plate 32. A cap screw 52 threaded into the slider plate 32 extends through an elongated slot 54 in the saddle 50 and holds the casting B2 against the face of the slider plate. Vertical adjustment of the casting B2 on the slider 32 is accomplished by thumb screw 56X which is threaded within block 58 affixed to the bottom edge of the slider. The upper limit of vertical reciprocable movement of the slider 32 is determined by adjusting screw 60X which is also threaded in the block 58 and abuts against the lower edge of the guideway 30.

As will be more fully described hereinafter, the adjusting screws 56X and 60X establish an upper reference level and assist in setting the vertical relationship between the scissors element S and the bonding capillary B1 so that the blades of the scissors can repeatedly be accurately positioned with respect to the capillary during cut-off.

Figure 2:
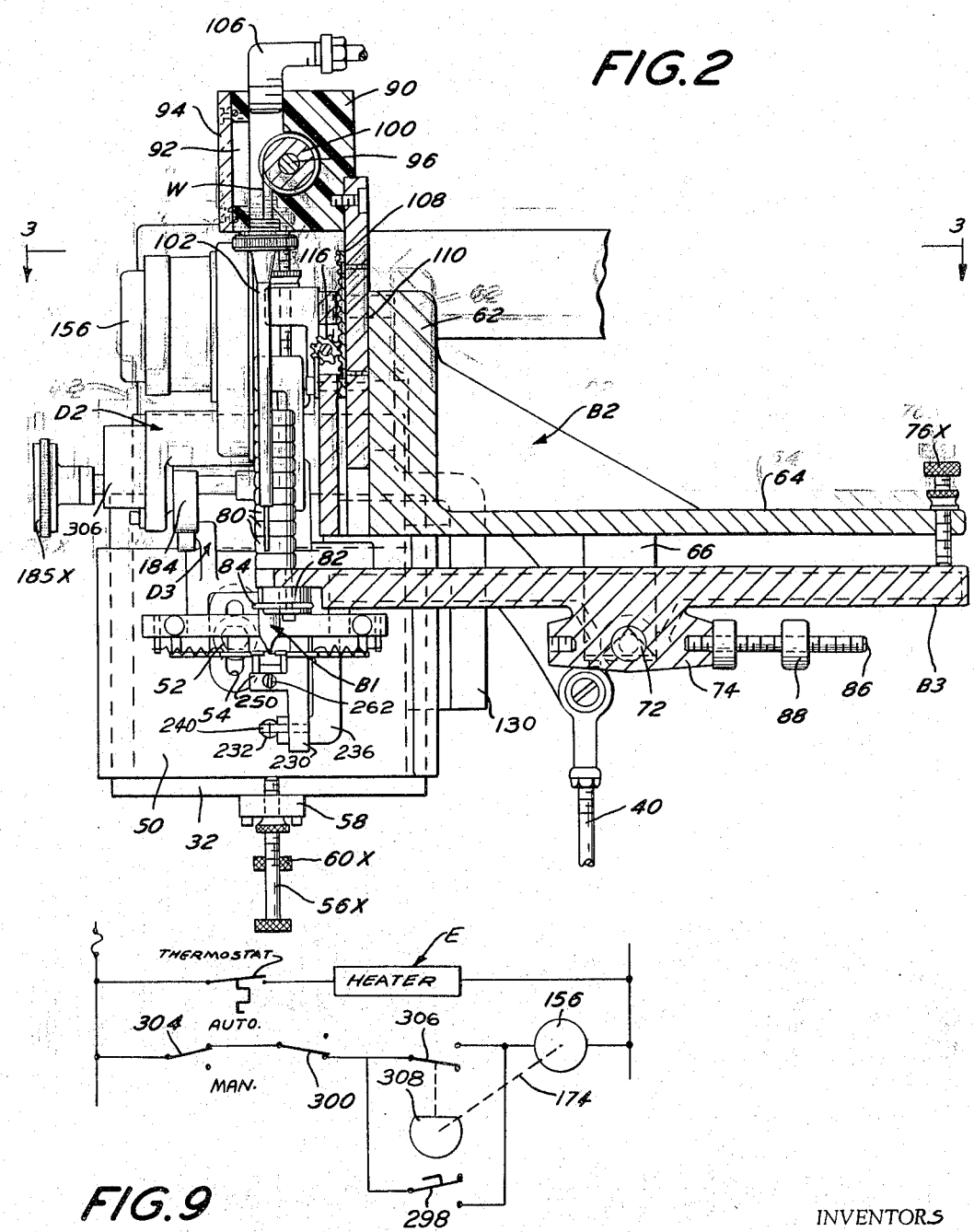
FIGURE 2 is a sectional view taken along lines 2—2 of FIGURE 1.

The cantilevered body of the casting B2 includes a bracket portion 62, upon which the wire dispenser C is supported, and a tail portion 64 having a medial bifurcated bridge 66 in which the bonding arm B3 is pivotally mounted. See FIGURE 2. Opposing conically pointed trunnions 68 are adjustably secured within the bridge 66 by screw clamps 70. The spaced points of the trunnions 68 rotatably support the end bearings of pivot shaft 72 which is locked within the medial hub 74 of the bonding arm B3. Adjusting screw 76X is threaded within the tail 64 and limits the counterclockwise rotation of the bonding arm B3, as shown in FIGURE 2.

Upwardly extending from the forward end of the bonding arm B3 are a pair of loading rods 78 which support suitable weights 80 for controlling the bonding pressure. The capillary B1 itself is retained within a V-notched mounting stub 82 by an O-ring garter 84 and downwardly projects therefrom. The capillary B1, which may either be carbide or glass, has a bore extending therethrough into which the wire W is threaded as a needle. A threaded rod 86 outwardly extends rearwardly from the hub 74, and a counterbalance weight 88 is threaded thereon for balancing the load of the forward weights 80 as desired.

The wire feeding assembly C is substantially identical to that fully shown and described in U.S. Patent No. 3,250,452, issued May 10, 1966 for an invention by Thomas L. Angelucci and Frederick W. Kulicke, Jr. entitled "Nail Head Bonding Apparatus for Thermocompressively Securing Lead Wire to Semiconductor Devices." It comprises a housing 90 having a centrally disposed chamber 92 therein. The face of the housing has a transparent plate 94 secured thereto so that wire loading, threading and unspooling operations will be clearly visible to the operator. A "Teflon" mandrel 96 is rotatably supported within the chamber 92 and is adapted to be turned in either direction by a knurled knob 98. A tool 100, upon which the fine wire W is wound, is mounted upon the mandrel 96 so that the wire may be dispensed through feed tube 102 downwardly projecting from the housing 90. Access to the interior of the housing 90 is provided by removing cap plug 104 which is detachably threaded thereto. The upper portion of the feed tube has a conically flared orifice (not shown) which acts as an entrance funnel to facilitate threading of the wire into the bore of the feed tube 102. The lower end of the feed tube is annularly reduced so as to freely interfit within the bore of the capillary B1. A reducing gas, such as nitrogen, is introduced into the chamber 92 through a fitting 106 mounted upon the top of the housing in order to facilitate wire loading operations and to prevent contamination of the wire W after the spool 100 has been mounted upon the mandrel 96. A rack member 108 is fixed to the rear of the housing 90 and downwardly extends therefrom where it is slidably received within a vertically disposed slot of casing 110. The casing is secured to the bracket portion 62 of the head casting B2. Vertical orientation of the feed tube 102 with respect to the capillary B1 is accomplished by suitable rotation of knob 112. The knob 112 has a shaft 114 which is horizontally journaled within the casing 110. A pinion gear 116 is affixed to the shaft 114 and engages the teeth of the rack member 108.

The cut-off assembly D is secured to the vertical guideway 30 of the manipulator F. Thus, while both the bonding head B and the cut-off assembly D are simultaneously positioned in a horizontal plane with respect to the semiconductor device T, it is only the bonding head B which is vertically reciprocable. The cut-off assembly D includes a mounting casting 130 which is rigidly secured by socket head screws 132 to one edge of the guideway plate 30. See FIGURE 3. The outboard leg of the casting 130 has a vertically disposed keyway 134 which is adapted to slidably receive a complementary guide key 136 affixed to the back face of main bracket plate D1. A pair of springs 138 are tensioned between hangers 140 projecting rearwardly from the lower portion of the bracket plate D1 and hangers 142 outwardly extending from the casting 130. These springs 138 bias the bracket plate D1 upwardly against a vertical thumb adjusting screw 144X which is threaded in a support block 146 traversing the top of the keyway 134, as shown in FIGURE 4. A locking thumb screw 148 passes freely through a elongated aperture 150 communicating with the keyway 134 in the casting 130 and is horizontally threaded within a tapped hole in the guide key 136. The locking screw 148 maintains the bracket plate D1 in fixed disposition with respect to the casting 130 after fine vertical adjustment of the scissors S with respect to the capillary B1 has been made by the adjusting screw 144X.

Figure 3:
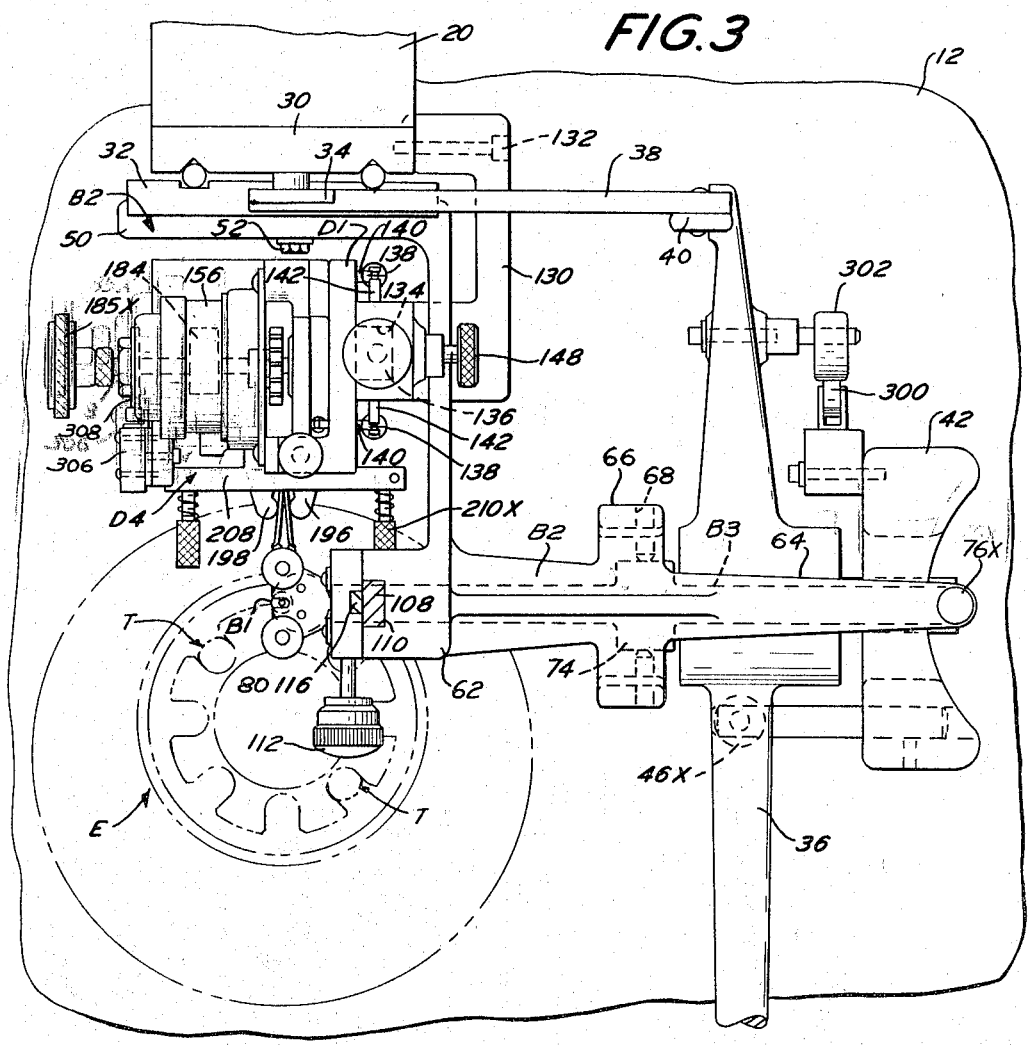
FIGURE 3 is a sectional view taken along lines 3—3 of FIGURE 2.

Referring now to FIGURES 1, 3 and particularly the exploded perspective of FIGURE 5, a yoke D2 is pivotally supported upon a socket head shoulder screw 152 which is threaded within a tapped hole in a boss 154 of the bracket plate D1. A scissors actuating motor 156 is mounted upon the yoke D2. Screws 157 support the motor 156 upon a pair of arms 158 and 160 which divergently extend upwardly from one side of the yoke. Biasing spring 162 coupled between a hanger pin 164 in the bracket plate D1 and hanger 166 in the medial portion of arm 158 urges the yoke D2 in a counterclockwise direction, as shown in FIGURE 5, and into abutment with adjusting screw 168X threaded through a tapped hole in bracket plate projection 170. A lock nut 172 is also threaded upon the screw 168X in order to fix the vertical disposition of this adjusting screw. A shaft 174 is rotatably supported within opposing yoke bearings 176 and 178. Gears 180 and 182 couple the shaft 174 to the output of the drive motor 156. An eccentric cam 184 is fixed about the shaft 174 and engages cam follower 186 which is rotatably supported upon projection 188 of actuating fork D3.

Actuating fork D3 is hingedly supported upon shoulder screw 190 which is threaded within a tapped hole 192 in the bracket plate D1. The fork D3 has a pair of camming rods 194 which outwardly extend from the legs thereof and bear against upstanding pins 195 on L-shaped actuator fingers 196 and 198. These actuators are rotatably supported upon respective vertically oriented spindles 200 which downwardly depend from scissors cradle block D4. Opposing tips on the fingers 196 and 198 are adapted to engage the sides of the scissors S and effect closure thereof when the actuating fork D3 is urged by eccentric 184 in a counterclockwise direction, as shown in FIGURES 1 and 5. Coil springs 202 are tensioned between hangers 204 upwardly projecting from the actuators 196 and 198 and hangers 206 downwardly extending from cradle T-bar 208. These springs 204 bias the actuator pins 195 against the camming rods 194 of the fork D3 and maintain the follower 186 in engagement with the eccentric 184. Knurled stop screws 210X are horizontally threaded in the T-bar 208 and adjustably limit the counterclockwise rotation of the actuator fork D3 by abutting against the camming rods 194 thereof.

Figure 6:
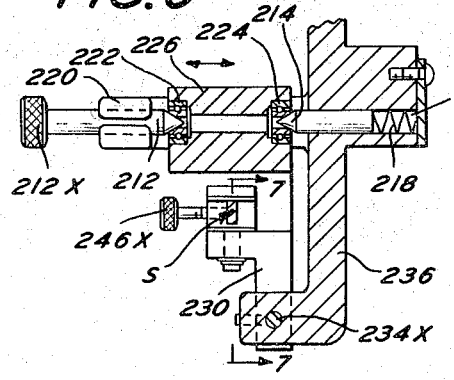
FIGURE 6 is a sectional view taken along lines 6—6 of FIGURE 1.

The cradle D4 is pivotally supported in the bracket plate D1 between cone-pointed supports 212 and 214. The support 214 is axially slidable in a blind hole 216 in the lower portion of bracket plate D1 and is resilient urged from right to left, as shown in FIGURE 6, by a coil spring 218. The cone point 212 is formed on the end of adjusting thumb screw 212X which is threaded within split clamp member 220 of the bracket plate D1. Thus, horizontal positioning of the cradle D4, and hence the horizontal positioning of the scissors S along an X-axis with respect to the capillary B1, is accomplished by appropriate adjustment of the thumb screw 212X in opposition to the bias of sliding cone support 214. Points of the cones 212 and 214 engage respective bearings 222 and 224 mounted within cylindrical body portion 226 integrally formed with the cradle D4. A toe 230 downwardly projects from the cradle D4 and is urged by spring 232 into abutment with thumb screw 234X horizontally threaded within leg 236 of the bracket plate D1. The spring 232 is tensioned between plate hanger pin 238 and cradle hanger pin 240. Thus, rotational adjustment of the cradle D4 about a horizontal axis is accomplished conveniently by turning the adjusting screw 234X in the appropriate direction.

Figure 7:
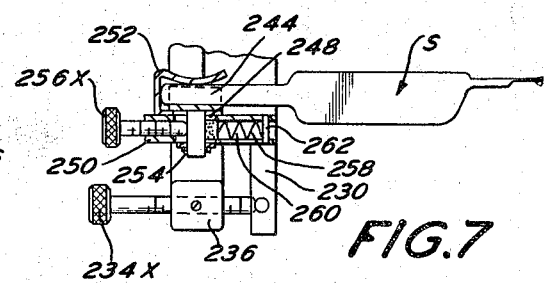
FIGURE 7 is a sectional view taken along lines 7—7 of FIGURE 6.
Figure 8:
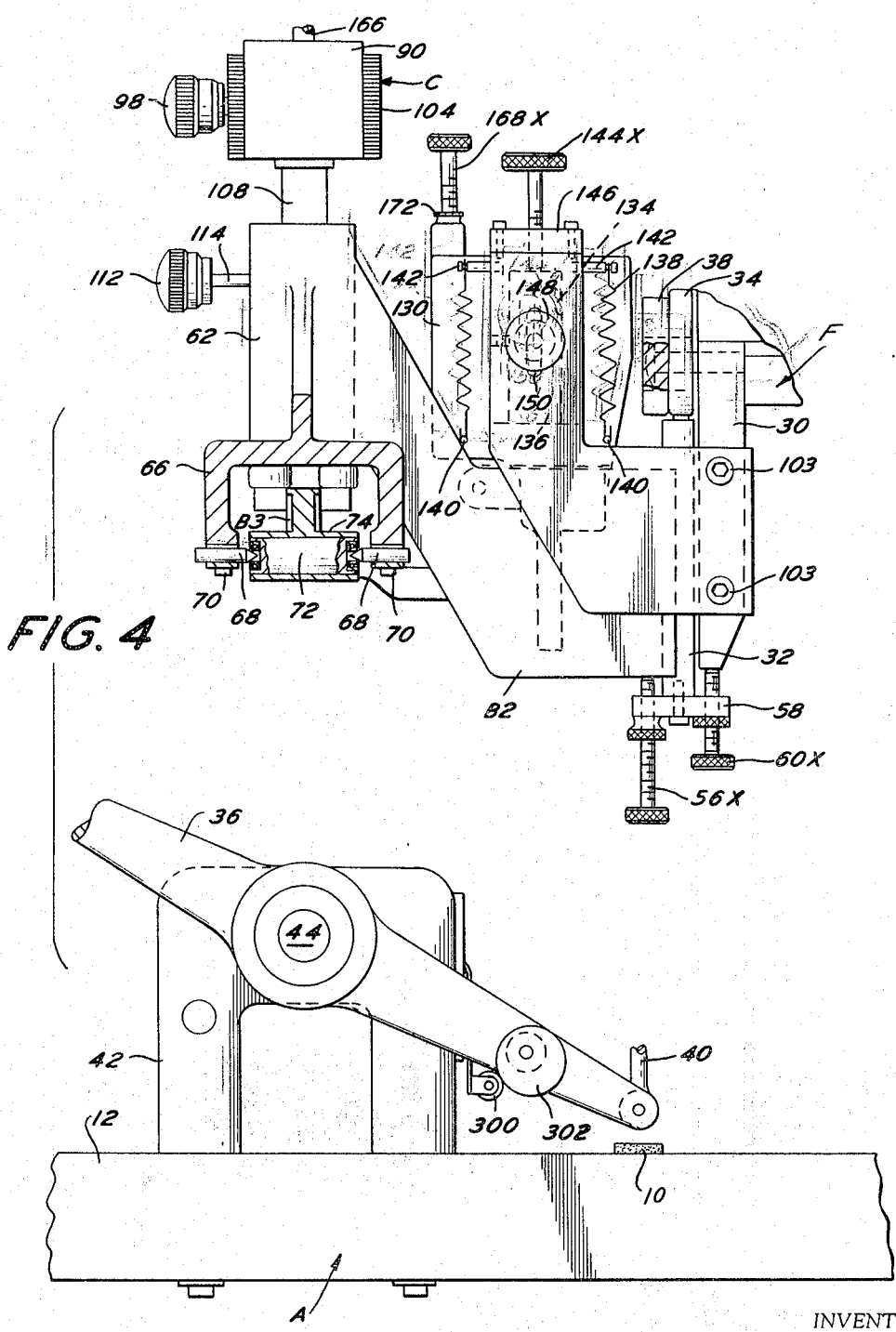
FIGURE 8 is a sectional view taken along lines 8—8 of FIGURE 1.

The scissors S is detachably received within the cradle D4 and is retained within the slotted head of seating stud 244 by thumb set screw 246X. The stem of the seating stud 244 is slidably received within a elongated slot 248 formed in shelf 250 of the cradle D4. A spring clip 252 of generally U-shaped configuration extends about the head of the stud 244, the stem of the stud passing through a slotted opening provided in the lower leg of the spring clip. The upper leg of the spring clip resiliently embraces the handle of the scissors S. A bowed spring washer 254 is snapped over the lower end of the stud stem and resiliently bears against the bottom of the shelf 250. Adjusting thumb screw 256X is horizontally threaded through a tapped hole in the rearward portion of the shelf 250 and engaged against the stem of the stud 244 in opposition to the bias of coil spring 258. Spring 258 is retained in a horizontal bore 260 in the forward portion of the shelf. Roll pin 262 acts as a blind stop for the coil spring 258. See FIGURE 7. Thus, the thumb screw 256X acting in opposition to the coil spring 258 longitudinally positions the stud within the slot 248. This adjustment, accordingly, controls disposition of the scissors along its own axis in a Y-direction with respect to the capillary B1.

The scissors S is an integrally formed tweezers element comprising a pair of spring sides 264 which extend from a handle neck 266 at one end. Tines 268 project from the forward portion of the sides 264 and have respective blades 270 which are welded thereto. The blades 270 are essentially triangular in plan configuration and are resiliently urged in spaced relationship by the spring sides. The thickness of each blade is approximately .002″. It is the thickness of these blades 270 and the precise position at which they must be oriented with respect to the capillary tip B1 which comprise essential elements of this invention. That is, the capillary tip B1 must freely pass between the blades 270 when they are open. In addition, when the blades are closed to sever the wire below the capillary tip, the upper blade must tuck the downwardly depending end of the severed wire W in the form of a button hook or "L" under the capillary tip. The top surface of the upper blade, in scissors cut-off position, is so oriented as to be spaced with minimum working clearance immediately below the capillary tip B1 by a distance approximately the diameter of the particular wire W being used for making leads. See FIGURES 15 and 16. Shearing of the wire occurs at the interface between the upper and lower blades 270. However, since the thickness of each blade is .002 inch, the upper blade of the scissors carries along a .002 inch increment of wire depending from the capillary. As the upper and lower blades overlap, the upper blade forces this small increment protruding from the capillary bore against the periphery thereof. Further traversing of the upper blade then bends and wedges the protruding wire end between the blade upper surface and the tip of the capillary where it is formed as a small hook. The capillary tip B1 works against the L-shaped wire hook in making the first wedge bond, as illustrated in FIGURES 11, 12 and 13.

Figure 9:
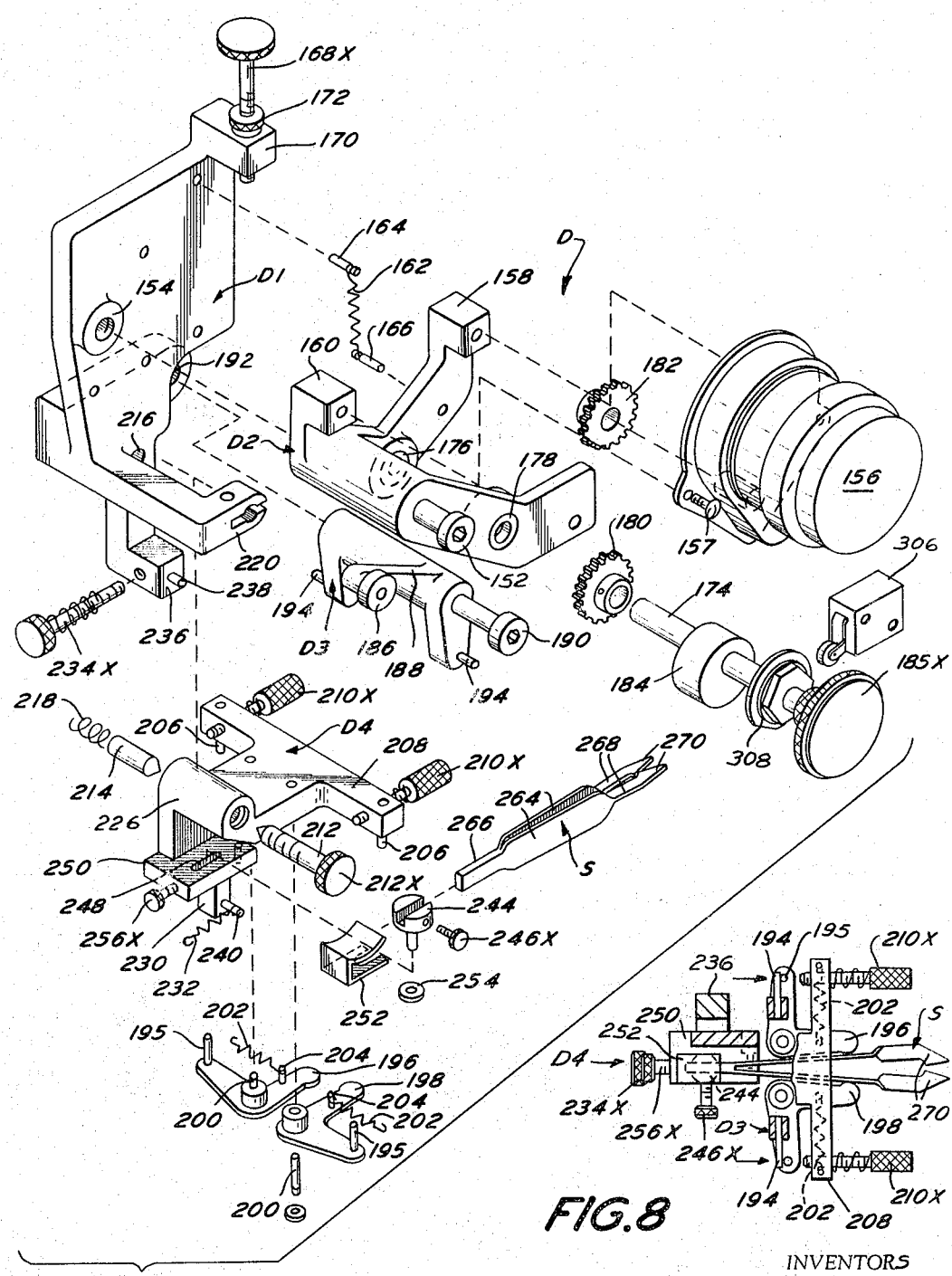
FIGURE 9 is a schematic diagram of the electrical circuit.

Referring now to the across-the-line schematic diagram of FIGURE 9, which illustrates the electrical controls for actuating the scissors S, momentary depression of the foot treadle switch 298 closes the electrical circuit to the scissors motor 156 through interlock microswitch 300 and "Auto-Man" switch 304. The motor 156 must cause the cam shaft 174 to rotate through one single revolution and no more. It is to be observed that the foot treadle switch 296 is in parallel with a cut-off switch 306 which is mounted upon one arm of the yoke D2 and actuated by cam 308. Cam 308, which is mounted on the shaft 174 and rotatable therewith, has a small flat surface interrupting the circumferential "round." As soon as the motor 156 begins to turn shaft 174, the "round" of cam 308 retains the contacts of cut-off switch 306 in closed position. When the shaft 174 has completed a full revolution, the "flat" of cam 308 interrupts the circuit to the motor 156 by opening the contacts of cut-off switch 306. The single revolution motor cycle is repeated by again momentarily depressing the foot treadle switch 298.

Since damage to both the scissors S and the capillary B1 would occur if the capillary tip were lowered between the scissors blades 270 at the time of closure thereof, the interlock switch 300 is provided to retain the scissors motor circuit open when the Z-lever 36 is depressed. The interlock switch 300 is mounted on the pedestal 42 and is adapted to be engaged by an eccentric lobe 302 supported on the Z-lever 36. The lobe 302 is rotatably adjusted until the slightest hand depression of the Z-actuating lever opens the contacts of interlock switch 300.

As is apparent from the foregoing description, a plurality of adjustments have been incorporated on this scissors cut-off bonding instrument in order to accommodate for quick capillary and scissors replacement and to enable the lead bonding apparatus to perform expeditiously on the wide range of semiconductor devices presently available and hereinafter to be designed. The various adjustments (identified by the suffix "X") will now be briefly reviewed.

Proper positioning of the scissors blades 270 with respect to the bonding capillary B1 is of prime importance in obtaining efficient use of this instrument as a production tool. The upper limit of the vertically-reciprocable stroke of the bonding head B, and consequently the capillary B1, is set by stop screw 60X which abuts the bottom of guideway 30 when the Z-lever 36 is released. There should be approximately ⅛ inch clearance between the connecting rod 40 coupled end of the Z-lever and rubber bumper 10. Setting adjusting screw 60X provides an accurate repeatable stop for the bonding capillary B1 during cut-off operation. The vertical elevation of the capillary at its upper stop position is determined by adjusting screw 56X which vertically positions the bonding head bracket B2 on the slider plate 32. The bottom of the stroke of the bonding head B is controlled by adjusting screw 46X which limits the clockwise rotation of the Z-lever 36. This stop point is established by depressing the Z-lever 36 until the capillary B1 abuts against the lowest bonding point on the semiconductor T and pivots the bonding arm B3 just off from its rest 76X. That is, with the capillary just touching the lowest bonding point on the transistor header, the bottom limit stop screw 46X is adjusted to provide .015 inch clearance between bonding arm B3 and rest stop screw 76X. Excessive pivotal rotation of the bonding arm B3 is likely to cause "scrubbing" by the capillary during bonding, and hence it is desirable to eliminate operator discretion with respect to bonding upon the semiconductor surface.

The scissors S are mounted by inserting them between the actuating fingers 196 and 198 into the slotted head of stud 244. The handle 266 is clamped in position by set screw 246X. The scissors blades 270 are longitudinally and laterally centered with respect to the capillary tip by means of respective adjusting screws 256X and 212X. Perpendicularity of the scissors blades 270 with respect to the capillary is accomplished by thumb screw 234X. Fine vertical adjustment of the spacing between the capillary tip B1 and the scissors blades is controlled by height screw 144X. The cut-off operation should leave a minimum size hook at the end of the wire depending from the capillary B1 in order to prevent its being drawn up into the bore thereof. Furthermore, the height of cut-off must leave a sufficient length of wire for bonding to the next point on the semiconductor T. That is, a larger space between the semiconductor T and the scissors S permits the capillary to be elevated a greater distance above the first bond. While a greater elevation is necessary to yield enough wire W for making the second bond (see FIGURES 13 and 14) without stressing both the first bonded lead and the first bond itself, it is also apparent that a longer lead would result after cut-off. See FIGURES 15 and 16. Accordingly, the cut-off position must be such as to provide a minimal length of wire for bonding to the next point.

The degree of closure of the scissors blades 270 is determined by yoke pivot-control screw 168X. That is, since the total available movement of the scissors is established by the rotation of the eccentric 184, the starting point of closure is measured by the initial position of the eccentric with respect to the fork D3. Therefore, by adjusting the yoke D2 around its pivot 190, screw 168X establishes the amount of overlapping of the scissors blades 270 at cut-off.

The stop screws 210X also cooperate with the yoke control screw 168X in determining the degree of scissors closure. Thus, the pivotal rotation of the actuating fingers 196 and 198 is limited by abutment of the pins 195 with the stop screws 210X. If there is further displacement available as a result of additional camming rotation of the eccentric 184, it is translated into upward pivotal action of the cradle D4. This controls the amount that the scissors blades will tilt upwardly and around the capillary tip after cut-off. The pivoting action of the scissors is particularly useful when heavy gauge or hard wire is employed in order to insure the formation of an L-shaped bend.

The capillary B1 is initially threaded by lowering the dispenser C with knob 112 until the tip of the feed tube 102 projects within the capillary bore. The gas supply is turned on with a suitable control (not shown) on the panel 16 whereby gas will be introduced into the housing chamber 92 through fitting 106. While gently tapping the feed tube 102, wire feed knob 98 is rotated to unspool the wire wound on the spool so that the wire will be threaded on a stream of gas through the capillary bore. After the capillary is loaded and has a length of wire depending therethrough, the dispenser C is raised by knob 112 to remove the feed tube 102 from insertion within the capillary bore.

With the capillary B1 threaded with wire, and the various adjustments performed as hereinbefore described, the scissors S are actuated by depressing foot switch 298. FIGURE 10 is illustrative of the position of elements although the depending wire will not at this time be secured to the semiconductor T. Closure of the scissors blades 270 effects the formation of the L-shaped wire hook under the capillary tip, as shown in FIGURE 11. When the blades 270 are open, there is sufficient clearance to permit the capillary B1 to descend and pass freely therebetween as the bonding head B is depressed. The chessman 26 and the Z-lever 36 are then manipulated to place the capillary tip B1 with the L-shape hook of wire thereunder directly over the bonding point on the wafer, e.g. a stripe. When the Z-lever 36 is depressed against the stop 46X, the capillary tip bears against the hook and urges the wire into contact with the semiconductor, as shown in FIGURE 12. The bonding arm B3 will have pivoted through a small angle off from the stop 76X so that a predetermined bonding loading force is applied. The bonding load is held for a few seconds whereupon a thermocompression wedge bond is made on the hook in engagement with the semiconductor surface.

Releasing the Z-lever 36 will permit the bonding tip to the elevated upwardly through the scissors blades 270 as shown in FIGURE 13. The length of wire between the bonding tip and the end bonded to the semiconductor T is sufficient to permit this lead to be coupled to the post of the semiconductor without undue strain. The chessman manipulator 26 is now repositioned so as to orient the capillary B1 while lowering the capillary to form a minimum loop from the first bond to the second bond at the post. See FIGURE 14. The Z-lever 36 is again held against its stop 46X for several seconds in order to secure the second bond. The Z-lever 36 is now raised to its upper limit whereby the stop 60X is in abutment to the bottom of the guideway 30, as shown in FIGURE 15. The bottom of the capillary tip B1 is now immediately above the scissors blades 270 preparatory to cut-off. Depression of the cut-off foot switch 298 will now cycle the motor 156 through a single revolution whereby the scissors blades 270 will sever the wire and tuck the depending end of the wire as a hook under the capillary tip preparatory to another bonding sequence. The position at cut-off is illustrated in FIGURE 16. After the motor has completed its cycle, the scissors will have again opened to the position as shown in FIGURE 11 in preparation for a subsequent bonding sequence.

Although this invention has been described in considerable detail, such description is intended as being illustrative rather than limiting, since the invention may be variously embodied, and the scope of the invention is to be determined as claimed.

What is claimed is:

1. In a lead bonding apparatus in which wire is continuously dispensed from a spool to a vertically-reciprocable capillary, wire cut-off means comprising a tweezers-like element having thin blades formed on the ends thereof to define a scissors, bracket means detachably supporting said scissors immediately below the tip of said capillary at the elevated portion of the vertical stroke thereof, means actuating the closure of said scissors only when said capillary is in said elevated position whereby the wire will be severed and its depending end will be tucked as a hook under the tip of said capillary, means to elevate said bracket means immediately after the hook is formed by the scissors so that the upper blade compresses the hook into coined engagement with the capillary tip to impart a positive kink in hard and heavy gauge wire for maintaining the hook in curled engagement with the tip preparatory to making a bond, and 2. In a lead bonding apparatus, a vertically reciprocable capillary to which wire is dispensed from a spool, means for vertically reciprocating said capillary, an integrally-formed scissors, adapted to be interchangeably and releasably mounted as a unit within the apparatus, bracket means detachably supporting said scissors in normally open position below the tip of said capillary when the latter is at the elevated portion of its vertical stroke, adjusting means for orienting said bracket about X-, Y-, and Z-axes whereby the blades of said scissors can be longitudinally, laterally and vertically positioned with respect to said capillary, and means actuating the closure of said scissors so that the blades thereof will sever wire threaded through said capillary and tuck the downwardly depending wire end as an L-shaped hook under the capillary tip whereby depression of said capillary will cause it to bear against said hook preparatory to making a wedge bond.

3. The invention of claim 2 wherein said scissors comprises a tweezers-like element having arms resiliently urged in spaced apart relationship, and thin flat blades at the ends of the arms which are adapted to intercept each other in adjacent planes, and means coupled with the means actuating the closure of said scissors to limit the degree of closure of the blades and thereby controlling the line along which the blades cut the wire.

4. Wire cut-off means for thermocompression lead bonding apparatus in which spooled wire is dispensed to a vertically reciprocable capillary, comprising a bracket, a yoke supported in said bracket and vertically adjustable therein, eccentric means rotatable in said yoke, a fork pivotally supported in said bracket and in camming engagement with said eccentric means, a cradle pivotally supported about a horizontal axis in said bracket and rotatably biased into adjustably-oriented angular disposition therein, a scissors detachably mounted in said cradle, actuating fingers on said cradle urged by said fork against opposing sides of the scissors, said bracket being adapted to be positioned with respect to said capillary so that said scissors will be disposed at the top portion of the capillary's vertical stroke, immediately below the tip thereof, and electrically operative drive means actuating the rotation of said eccentric means whereby the scissors will sever the wire depending from the capillary and tuck the depending severed end as an L-shaped hook under the tip thereof.

5. The invention of claim 4 including stop means to abut against said actuating fingers immediately after the scissors have closed sufficiently to sever the wire so that said cradle is caused to pivot against its opposing bias whereby the scissors will be upwardly tilted around the capillary tip and thus make a positive bend in hard and heavy gauge wire.

6. Lead bonding apparatus comprising a capillary, means to dispense wire through said capillary, scissors means having blades disposed transverse to the axis of said capillary, means to move said capillary relative to said scissors means, means to actuate the closure of the scissors when the tip of said capillary is disposed immediately adjacent to the blades thereof so as to snip the wire and form it as an L-shaped hook about the capillary tip, and means to preclude actuation of said scissors means when said capillary is disposed between the blades, said scissors means comprising a tweezers-like element having arms resiliently urged in spaced apart relationship, and thin flat blades at the ends of the arms which are adapted to intercept each other in adjacent planes.

7. Lead bonding apparatus comprising a capillary having wire dispensed therethrough, wire shearing means constituting an integrally-formed bladed element which is adapted to be interchangeably and releasably mounted as a unit within said apparatus, means for detachably clamping said wire shearing means in the apparatus so that the blades thereof are disposed transverse to the axis of the wire being dispensed, means for supporting a semiconductor device, means to move said capillary through said wire shearing means and into engagement with the semiconductor device, and means to actuate the closure of the blades of said shearing means when the tip of said capillary is disposed immediately adjacent the blades so as to snip the wire and form it as an L-shaped hook about the capillary tip whereby the hook will be wedged intermediate the capillary tip and the semiconductor device during bonding, including means to adjustably position the means for clamping the wire shearing means along X-, Y-, and Z-axes whereby the blades can be accurately oriented longitudinally, laterally and vertically with respect to said capillary.

8. The invention of claim 7 including means to limit the degree of closure of the blades after the wire has been cut, and means to move said shearing means with respect to the tip of said capillary so that the adjacent blade compresses the formed hook into coined engagement with said capillary and positively kinks the wire.

9. The invention of claim 7 wherein said shearing means comprises a unitary tweezers-like element having arms extending from a closed neck, the ends of the arms being resiliently urged into spaced apart disposition, and the blades being secured to the ends of said arms in adjacent parallel planes.

References Cited by the Examiner

UNITED STATES PATENTS

| | | | |
|---|---|---|---|
| 2,644,069 | 6/1953 | Pityo | 140—112 |
| 2,754,908 | 7/1957 | Proud | 83—575 |
| 3,087,239 | 4/1963 | Clagett | 228—4 |
| 3,186,446 | 6/1965 | Hunt | 228—44 |

JOHN F. CAMPBELL, *Primary Examiner.*

WHITMORE A. WILTZ, *Examiner.*

M. L. FAIGUS, *Assistant Examiner.*